(12) United States Patent
Stallings

(10) Patent No.: US 9,171,067 B2
(45) Date of Patent: Oct. 27, 2015

(54) HLA TO XML CONVERSION

(75) Inventor: Jared D. Stallings, Denver, CO (US)

(73) Assignee: Raytheon Company, Waltham, MA (US)

( * ) Notice: Subject to any disclaimer, the term of this patent is extended or adjusted under 35 U.S.C. 154(b) by 2051 days.

(21) Appl. No.: 12/171,714

(22) Filed: Jul. 11, 2008

(65) Prior Publication Data

US 2009/0271423 A1 Oct. 29, 2009

Related U.S. Application Data

(60) Provisional application No. 61/047,396, filed on Apr. 23, 2008.

(51) Int. Cl.
*G06F 17/30* (2006.01)

(52) U.S. Cl.
CPC ................................ *G06F 17/30699* (2013.01)

(58) Field of Classification Search
CPC ..................... G06F 17/30569; G06F 17/30575
USPC .................. 707/756, 811, 809, 966; 715/239; 709/201
See application file for complete search history.

(56) References Cited

U.S. PATENT DOCUMENTS

| | | | |
|---|---|---|---|
| 6,934,709 B2 * | 8/2005 | Tewksbary | 707/707 |
| H2201 H | 9/2007 | Stytz et al. | 717/104 |
| 7,310,684 B2 | 12/2007 | Patrick et al. | 709/238 |
| 7,321,861 B1 | 1/2008 | Oon | 705/3 |
| 7,516,052 B2 | 4/2009 | Hatcherson et al. | 703/6 |
| 8,103,705 B2 * | 1/2012 | Chitrapura et al. | 707/809 |
| 8,239,426 B2 * | 8/2012 | Rangadass et al. | 707/809 |

OTHER PUBLICATIONS

Mattias Liljestrom, "Generic XML Based Interface for Computer Supported Collaborative Work in a HLA Environment," KTH Numerical Analysis and Computer Science, Masters Degree Project, 2005.*

* cited by examiner

*Primary Examiner* — Robert Beausoliel, Jr.
*Assistant Examiner* — Alexandria Bromell
(74) *Attorney, Agent, or Firm* — Schwegman Lundberg & Woessner, P.A.

(57) ABSTRACT

A method includes establishing a connection and subscribing to at least one channel of a High Level Architecture (HLA) federation and an Enterprise Service Bus (ESB). The method further includes receiving a text file defining the format of an HLA message; a first extensible Markup Language (XML) document conforming to a first schema that defines data within a first message type; and a second XML document conforming to a second schema that defines data within a second message type. The method further includes receiving a first HLA message over the at least one HLA channel, extracting at least one piece of data from the first HLA message, generating a first XML message, and publishing the first XML message over the at least one ESB channel. The method also includes receiving a second XML message over the at least one ESB channel, extracting at least one piece of data from the second XML message, generating a second HLA message conforming to the text file, and publishing the second HLA message over the at least one HLA channel.

20 Claims, 2 Drawing Sheets

HLA TO XML CONVERSION

CROSS-REFERENCE TO RELATED APPLICATION

This application claims the benefit of priority under 35 U.S.C. §119(e) of U.S. Provisional Application Ser. No. 61/047,396 filed Apr. 23, 2008.

TECHNICAL FIELD

This disclosure relates in general to service interoperability, and more specifically to HLA to XML conversion.

BACKGROUND

High Level Architecture (HLA) is a communication standard used during a computer simulation by software applications to communicate with one another. The HLA communication standards and initial infrastructure were developed by the United States Defense Modeling and Simulation Office (DMSO). As the standards matured, DMSO turned over infrastructure development to industry. In a war game simulation HLA may be used to manage the flow of data between the various hardware and software component that may be used to simulate various real-world counterparts (e.g., troops, vehicles, ships, etc.) during the war game. This may allow, for example, a tank to be simulated separately from a jeep, while still allowing the tank and jeep simulations to interact with one another.

An Enterprise Service Bus (ESB) may allow ESB clients to communicate with one another. The ESB clients may communicate via extensible Markup Language (XML). XML provides a way for structured data to be shared across different information systems, such as different ESB clients. Schemas may be used to define what an XML document should look like. XML messages may have a different format than HLA messages. One messaging service that may be used to transport XML documents is Java Messaging Service (JMS). JMS is commonly used to facilitate communication between Java implemented applications.

Traditionally, communication between an XML or JMS component and an HLA component required the use of a bridge to translate between the two services. Unfortunately, whenever a new type of message needed to be translated, new Java code had to be created. The Java code provided instructions on how the bridge was to map the fields of one message type to the other.

SUMMARY

In accordance with particular embodiments, a method includes establishing a connection to a High Level Architecture (HLA) federation and to an Enterprise Service Bus (ESB). The method also includes subscribing to at least one HLA channel and to at least on ESB channel. The method further includes receiving a text file defining the format of an HLA message. The method additionally includes receiving a first eXtensible Markup Language (XML) document conforming to a first schema. The first XML document defines data within a first message type. The method also includes receiving a second XML document conforming to a second schema. The second XML document defines data within a second message type. The method further includes receiving a first HLA message over the at least one HLA channel and then extracting at least one piece of data from the first HLA message via the first XML document. The method additionally includes generating a first XML message conforming to the second schema. The first XML message comprises the at least one piece of data from the first HLA message. The method also includes publishing the first XML message over the at least one ESB channel. The method further includes receiving a second XML message over the at least one ESB channel and extracting at least one piece of data from the second XML message via the second XML document. The method additionally includes generating a second HLA message conforming to the text file. The second HLA message comprises the at least one piece of data from the second XML message. The method further comprises publishing the second HLA message over the at least one HLA channel.

Technical advantages of particular embodiments may include allowing HLA and ESB services to communicate with one another. Accordingly, by simply providing the appropriate XML documents a user may provide the necessary information to allow the two different services to communicate with one another.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

Figure 1:
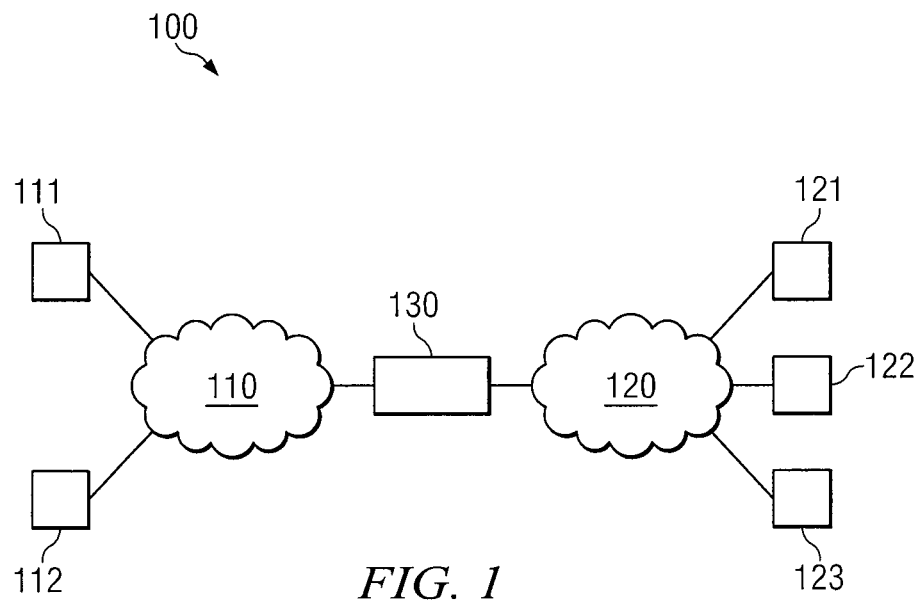
FIG. 1 depicts a block diagram of a bridge connecting a High Level Architecture (HLA) federation with an Enterprise Service Bus (ESB), in accordance with particular embodiments.

FIG. 1 depicts a block diagram of a bridge connecting a High Level Architecture (HLA) federation with an Enterprise Service Bus (ESB). Bridge 130 may be used as part of simulation environment 100 in which HLA federates 111-112 need to be able to send and receive messages with ESB clients 121-123. The messages used by HLA federates 111-112 may be of a different type or format than the messages used by ESB clients 121-123. Accordingly, bridge 130 may convert the messages from one type/format to the other to allow HLA federates 111-112 and ESB clients 121-123 to communicate with one another.

HLA federation 110 may comprise any hardware, software, and/or encoded logic needed to facilitate and/or manage the flow of communications between the HLA federates of HLA federation 110 (e.g., HLA federates 111-112). HLA federation 110 may, in essence, be a group of HLA federates participating in a simulation. The HLA federates of HLA federation 110 may communicate with one another by sending/receiving different types of messages. Prior to sending/receiving any messages the HLA federates of HLA federation 110 may receive a text file that defines the binary format of the various supported HLA message types. More specifically, the text file may include the various fields, and information related thereto, of each different message type. The text file may be distributed to all the HLA federates thus informing them of the type and content of the messages supported by HLA federation 110. However, this text file usually does not define subfields even though the HLA message may in fact have different pieces of information within a single field. In some embodiments, HLA federation 110 may comprise a Run Time Environment (RTI).

HLA federates 111-112 may comprise any software, hardware and/or encoded logic needed to simulate one or more particular elements or features of simulation 100. In some embodiments, each HLA federate 111 and 112 may be a program able to send and/or receive HLA messages. One or more of HLA federates 111 and 112 may be used to represent or simulate a different aspect of simulation 100. For example, HLA federate 111 may simulate a jet-fighter while HLA federate 112 may simulate a bomber. HLA federates 111 and 112 may comprise programs being run on the same or different computers. Even where HLA federates 111 and 112 are running on the same computer, they may still need to connect to HLA federation 110 to be able to communicate with one another. In particular embodiments, bridge 130 may include an HLA federate so that bridge 130 may be able to send and receive HLA messages with the other HLA federates 111-112. In particular embodiments, in order for an HLA federate to be able to receive messages they may first have to subscribe to particular channels from which they wish to receive messages. In addition, when a message is sent it is only published to certain channels. This may reduce the amount of messages that an HLA federate receives to only those messages in which it is interested (e.g., only those messages published on channels to which it has subscribed).

ESB 120 may comprise any software, hardware, and/or encoded logic needed to implement any messaging system or architecture. For example, in particular embodiments ESB 120 may comprise a messaging system operable to send and receive eXtensible Markup Language (XML) messages. These XML messages may conform to a specific XML schema. In instances where a particular message does not conform to the desired schema, an Extensible Stylesheet Language Transformation (XSLT) may be used to properly re-format the message. In some embodiments, ESB 130 may allow for Java Messaging Service (JMS) communications to be passed between ESB clients. In particular embodiments, ESB 120 may include several different channels that ESB clients may subscribe to so as to be able to receive messages that other ESB clients may have sent (publish). This may reduce the number of messages that an ESB client receives to only those messages in which it is interested (e.g., those messages published to a channel to which the ESB client subscribes).

ESB clients 121-123 may comprise any software, hardware and/or encoded logic needed to implement a particular application or service. ESB clients 121-123 may enhance simulation 100 by providing additional simulations and/or resources. ESB clients 121-123 may be capable of sending and/or receiving XML messages. For example, ESB client 121 may send an XML message using JMS. As with HLA federates 111-112, ESB clients 121-123 may be running on one or more different computers. Even when ESB clients are running on the same computer, they may still need to be connected to ESB 120 in order to send and receive information with each other. In particular embodiments, bridge 130 may comprise its own ESB client so that bridge 130 may be able to send and receive messages with any ESB clients that may be connected to ESB 120.

Bridge 130 may include any hardware, software, and/or encoded logic needed to convert messages sent between HLA federates 111-112 and ESB clients 121-123. As mentioned above, bridge 130 may register with HLA federation 110 as an HLA federate and with ESB 120 as an ESB client. Bridge 130 may also subscribe to several different channels within each of HLA federation 110 and ESB 120. This may allow bridge 130 to receive messages to and from HLA federation 110 and ESB 120. Bridge 130 may also be able to publish messages to several different and/or specific channels. Once bridge 130 has subscribed to the appropriate channels it may be able to receive messages from one side and convert them into messages that can be published to the other side. For example, bridge 130 may receive an XML message sent by ESB 121. Bridge 130 may convert the XML message into an HLA message and publish it on a particular channel so that those HLA federates interested in the message are able to receive it. As may be apparent, bridge 130 may allow messages to be communicated between clients and federates that would not normally be able to communicate with one another.

In order for bridge 130 to be able to convert between message formats it may need to know what data is contained in a message it receives and what format the data needs to be in when a message is sent out. Knowing what data is contained in a message may be determined using XML documents that conform to a specific schema; formatting a message may be done based on another schema or a configuration file (e.g., a text file describing the message). For example, in particular embodiments, each XML message that may be sent or received may conform to a specific schema that generally defines the format of XML messages. In addition, for each type of XML message there may be an XML document, which also conforms to the same schema, that describes the data within the message. Similarly, each HLA message that may be sent or received may conform to an HLA configuration file (e.g., a text file, sometimes referred to as a fed file) that generally defines the format of HLA messages. In addition, for each type of HLA message there may be an XML document, conforming to a different schema than the one used for the XML messages, which describes the data within the HLA messages. The unique XML documents may be used to explain the date within a message and how the data is arranged. Thus, bridge 130 may determine the contents of each message that it receives by using the appropriate XML document.

Figure 2:
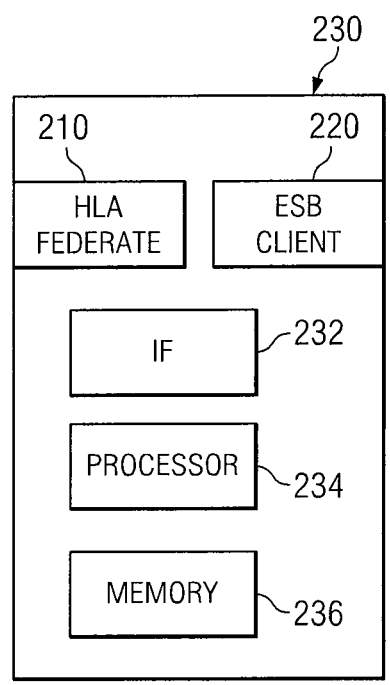
FIG. 2 depicts a schematic diagram of the components of a bridge, in accordance with particular embodiments.

FIG. 2 depicts a schematic diagram of the components of a bridge, in accordance with particular embodiments. More specifically, bridge 200 includes processor 210, memory 220, and interface 230. Other bridges may include additional, fewer and/or different components. In particular embodiments the components depicted in FIG. 2 may be shared with other applications and devices. For example, bridge 200 may be implemented in a computer that comprises a processor, memory and an interface.

Processor 210 may include any suitable combination of hardware operable to execute software, and/or encoded logic that controls and/or processes messages within bridge 200. The messages may include data as well as audio and video content. Depending on the embodiment, processor 210 may be a programmable logic device, a controller, a microcontroller, a microprocessor, any suitable processing device, or any combination of the preceding. Processor 210 may be operable to provide any functionality needed by bridge 200 either alone or in conjunction with other bridge 200 components (e.g., memory 220 and interface 230). Such functionality may include allowing devices or services in a distributed simulation that use different types of messages to be able to communicate with one another. In particular embodiments, this may be done using XML documents which conform to specific XML schemas which may be stored in memory 220.

This may allow a user to configure bridge 200 to be able to send and receive new messages from new or different devices and services by simply providing bridge 200 with a new XML document specifying the format and/or content of the new messages. This may be done without having to write any additional code. More specifically, whenever bridge 200 is to translate messages to or from a new type of service, the user simply provides bridge 200 with a new XML document describing the data within the new message, and possibly updating any configuration files that may be used to determine the format of the message.

Memory 220 may include any form of volatile or non-volatile memory including, without limitation, magnetic media, optical media, random access memory (RAM), read-only memory (ROM), removable media, or any other suitable local or remote memory component. Memory 220 may store any suitable data or information, including software and encoded logic, utilized by bridge 200. For example, memory 220 may maintain a listing, table, or other organization of information used in converting messages. For example, memory 220 may store each XML document used by processor 210 when it imports or exports data from a particular message. Memory 220 may also be used to store temporary or transitory data such as the data extracted from a received message before it has been placed in a message to be sent.

Interface 230 may represent any port or connection, real or virtual, including any hardware, software, or encoded logic needed to be able to send and receive messages from either HLA federates or ESB clients. For example, interface 230 may register bridge 200 as HLA federate 210 in an HLA federation and as ESB client 220 in an ESB. Once registered as HLA federate 210, bridge 200 may be able to send and receive messages from other HLA federates; similarly, once registered as an ESB client bridge 200 may be able to send and receive messages from other ESB clients.

Figure 3:
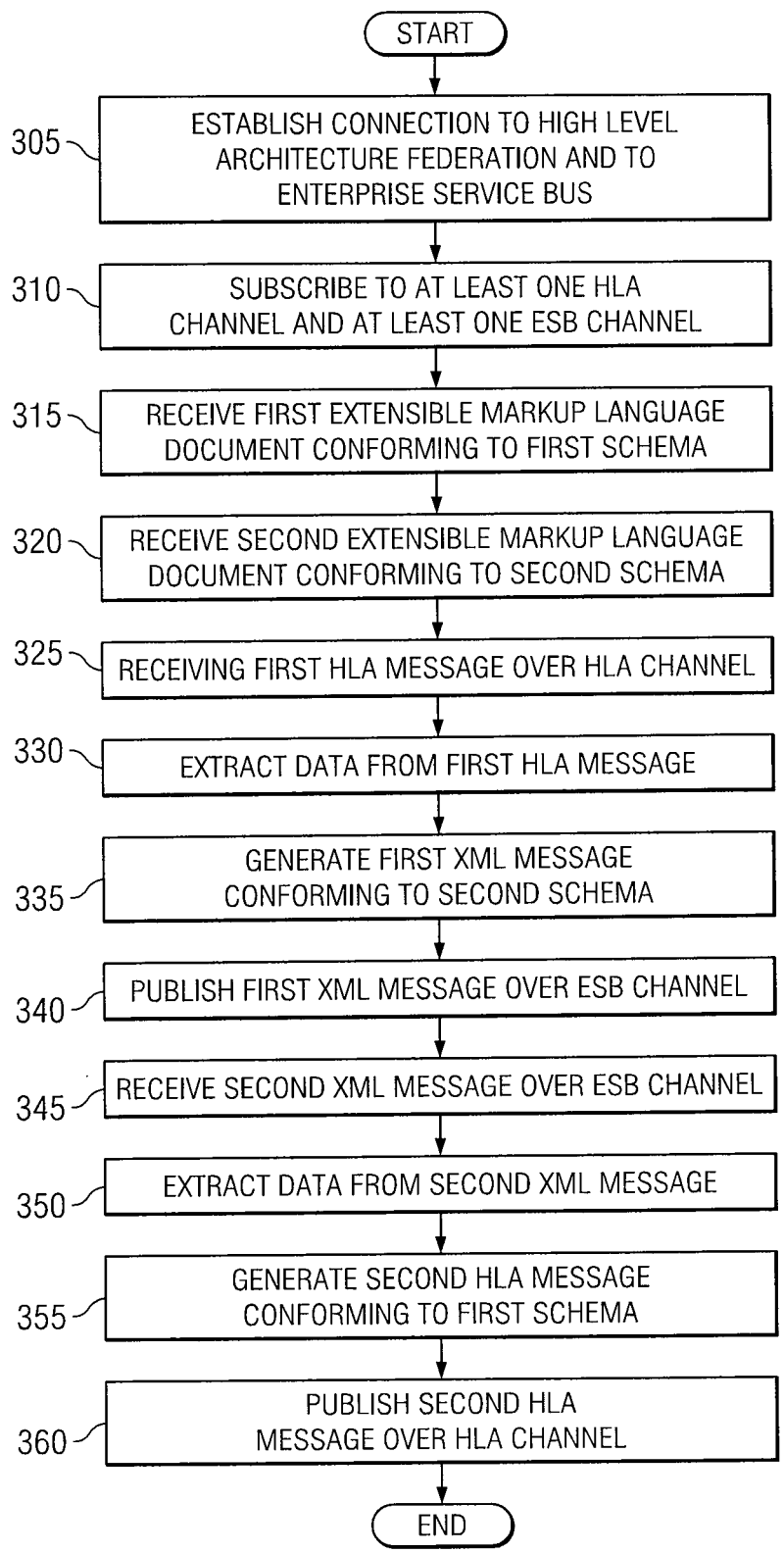
FIG. 3 depicts a method for converting between HLA and XML, in accordance with particular embodiments.

FIG. 3 depicts a method for converting between HLA and XML, in accordance with particular embodiments. The method illustrated in FIG. 3 is merely an example method, other embodiments and different scenarios may use different steps performed in a different order. For purposes of this method the steps are described from the perspective of a bridge. The method begins at step 305 with establishing a connection to an HLA federation (e.g., HLA federation 110) and to an ESB (e.g., ESB 120). In establishing a connection to the HLA federation, the bridge may receive a text file that defines the format of the HLA messages that may be used by any of the HLA federates. As part of establishing the respective connections, the bridge may also subscribe to at least one HLA channel as an HLA federate and to at least one ESB channel as an ESB client. This is shown at step 310. Once subscribed to a particular channel, the bridge may then be able to receive messages published on that channel by other HLA federates or ESB clients.

At step 315 a first XML document is received. The XML document may conform to a first schema and may define data (e.g., the type of date, where the data is located within the message) within a first message type. Similarly, at step 320 a second XML document is received. The second XML document may conform to a second schema and may define data within a second message type. In particular embodiments the XML documents received at steps 315 and 320 may be received based on an initialization file that lists the XML documents, and their location, to be used for a particular simulation. When a new simulation is run with different message types the initialization file may be updated to include a new XML document for the new message type. Thus, the bridge may be configured to work with new message types by simply creating a new XML document and providing the bridge with an updated initialization file that identifies the location of the new XML document. In some embodiments the new HLA messages may require an update to the HLA fed file (the text file used to define HLA message formats). However, an update to the schema used to define the XML message format may not be needed because it may be a generic format.

At step 325 a first HLA message is received over the at least one HLA channel. As may be apparent, in order for the bridge to receive the HLA message the bridge may first have subscribed to the channel (step 310) on which the message was published. As the message is received the bridge may also determine what type of HLA message was received. This may be used in selecting the appropriate XML document to use in extracting any desired data.

At step 330 at least one piece of data from the first HLA message is extracted via the first XML document. In other words, the bridge uses the XML document that corresponds to this type of HLA message to know what data to extract and where the data is located within the message. This extracted data may temporarily be stored in memory until it has been inserted into an outbound XML message.

At steps 335 and 340 a first XML message conforming to the second schema is generated and published. The first XML message may include the at least one piece of data that was extracted from the first HLA message at step 330. In publishing the XML message the bridge may select one or more channels to publish it on, but those channel need not necessarily be the same channels to which it subscribed at step 310. In particular embodiments the XML message may be published using Java Message Service. Once published, it may be said that the HLA message was successfully converted to an XML message.

Steps 345-360 may be similar to steps 325-340 except the message is being converted from XML to HLA. At step 345 a second XML message is received over the at least one ESB channel. As may be apparent, in order for the bridge to receive the XML message the bridge first had to have been subscribed to the appropriate channel (step 310) on which the message was published. As the message is received the bridge may also determine what type of XML message was received. This may be used in selecting the appropriate XML document to use to extract any desired data. In particular embodiments, the second XML message may itself conform to the second schema.

At step 350 at least one piece of data is extracted from the second XML message via the second XML document. In other words, the bridge uses the XML document that corresponds to this type of XML message to know what data to extract. This extracted data may temporarily be stored in memory until it has been inserted into an outbound HLA message.

At steps 355 and 360 a second HLA message conforming to the text file is generated and published. The second HLA message may include the at least one piece of data that was extracted from the second XML message at step 350. In publishing the second HLA message the bridge may use the at least one HLA channel to which it is subscribed (step 310).

Modifications, additions, or omissions may be made to the method depicted in FIG. 3. The flowchart may include more, fewer, or other steps. Additionally, steps may be performed in any suitable order and by any suitable component. For example, in particular embodiments the bridge may receive a second HLA message, and thus repeat steps 325-340 before it receives the second XML message and performs steps 345-360.

Although several embodiments have been described, a myriad of changes, variations, alterations, transformations, and modifications may be suggested to one skilled in the art, and it is intended that the some embodiments encompass such changes, variations, alterations, transformations, and modifications as falling within the scope of the appended claims. For example, while the depicted embodiments only show two HLA federates and three ESB clients, other embodiments may include any number of HLA federates and ESB clients as well any number of HLA federations and ESBs.

What is claimed is:

1. A method comprising:
   establishing a connection between a bridge and a High Level Architecture (HLA) federation, the bridge comprising at least one processor and at least one interface;
   establishing a connection between the bridge and an Enterprise Service Bus (ESB);
   subscribing to at least one HLA channel;
   subscribing to at least one ESB channel; receiving a text file defining the format of an HLA message;
   receiving a first eXtensible Markup Language (XML) document contributing to a first schema, the first XML document defining data within a first message type;
   receiving a second XML document conforming to a second schema, the second XML document defining data within a second message type;
   receiving a first HLA message over the at least one HLA channel;
   extracting at least one piece of data from the first HLA message via the first XML document;
   generating a first XML message conforming to the second schema, the first XML message comprising the at least one piece of data from tile first HLA message;
   publishing the first XML message over the at least one ESB channel;
   receiving a second XML message over the at least one ESB channel;
   extracting at least one piece of data from the second XML message via the second XML document;
   generating a second HLA message conforming to the text file, the second HLA message comprising the at least one piece of data from the second XML message; and
   publishing the second HLA message over the at least one HLA channel.

2. The method of claim 1, wherein publishing the first XML message over the at least one ESB channel comprises publishing the first XML message over the at least one ESB channel via Java Message Service (JMS).

3. The method of claim 1, further comprising determining a type of HLA message associated with the first HLA message.

4. The method of claim 1, further comprising determining a type of XML message associated with the second XML message.

5. The method of claim 1, further comprising receiving an initialization file comprising a list of XML documents, the list of XML documents comprises a location of the first XML document and the second XML document.

6. The method of claim 5, further comprising receiving an updated initialization file replacing the initialization file, the updated initialization file comprising an updated list of XML documents, the updated list of XML documents comprises a location of the first XML document, the second XML document, and a third XML document, the third XML document defining data within at a third XML message type.

7. An apparatus comprising:
   an interface operable to:
   establish a connection to a High Level Architecture (HLA) federation;
   establish a connection to an Enterprise Service Bus (ESB);
   subscribe to at least one HLA channel;
   subscribe to at least one ESB channel;
   receive a text file defining the format of an HLA message;
   receive a first eXtensible Markup Language (XML) document conforming to a first schema, the first XML document defining data within a first message type;
   receive a second XML document conforming to a second schema, the second XML document defining data within a second message type; and
   receive a first HLA message over the at least one HLA channel; and
   a processor coupled to the interface and operable to:
   extract at least one piece of data from the first HLA message via the first XML document; and
   generate a first XML message conforming to the second schema, the first XML message comprising the at least one piece of data from the first HLA message; and
   wherein the interface is further operable to:
   publish the first XML message over the at least one ESB channel; and
   receive a second XML message over the at least one ESB channel; and
   wherein the processor is further operable to:
   extract at least one piece of data from the second XML message via the second XML document; and
   generate a second HLA message conforming to the text file, the second HLA message comprising the at least one piece of data from the second XML message; and
   wherein the interface is further operable to publish the second HLA message over the at least one HLA channel.

8. The apparatus of claim 7, wherein the interface operable to publish the first XML message over the at least one ESB channel comprises an interface operable to publish the first XML message over the at least one ESB channel via Java Message Service (JMS).

9. The apparatus of claim 7, wherein the processor is further operable to determine a type of HLA message associated with the first HLA message.

10. The apparatus of claim 7, wherein the processor is further operable to determine a type of XML message associated with the second XML message.

11. The apparatus of claim 7, wherein the interface is further operable to receive an initialization file comprising a list of XML documents, the list of XML documents comprises a location of the first XML document and the second XML document.

12. The apparatus of claim 11, wherein the interface is further operable to receive an updated initialization file replacing the initialization file, the updated initialization file comprising an updated list of XML documents, the updated list of XML documents comprises a location of the first XML document, the second XML document, and a third XML document, the third XML document defining data within at a third XML message type.

13. Logic encoded in a non-transitory computer readable storage media that when executed is operable to:
   establish a connection to a High Level Architecture HLA federation;
   establish a connection to an Enterprise Service Bus (ESB);
   subscribe to at least one HLA channel;
   subscribe to at least one ESB channel;
   receive a text file defining the format of an HLA message;

receive a first eXtensible Markup Language (XML) document, conforming to a first schema, the first XML document defining data within a first message type;
receive a second XML document conforming to a second schema, the second XML document defining data within a second message type;
receive a first HLA message over the at least one HLA channel;
extract at least one piece of data from the first HLA message via the first XML document;
generate a first XML message conforming to the second schema, the first XML message comprising the at least one piece of data from the first HLA message;
publish the first XML message over the at least one ESB channel;
receive a second XML message over the at least one ESB channel;
extract at least one piece of data from the second XML message via the second XML document;
generate a second HLA message conforming to the text file, the second HLA message comprising the at least one piece of data from the second XML message; and
publish the second HLA message over the at least one HLA channel.

14. The media of claim 13, wherein the logic operable to publish the first XML message over the at least one ESB channel comprises logic operable to publish the first XML message over the at least one ESB channel via Java Message Service (JMS).

15. The media of claim 13, wherein the logic is further operable to determine a type of HLA message associated with the first HLA message.

16. The media of claim 13, wherein the logic is further operable to determine a type of XML message associated with the second XML message.

17. The media of claim 13, wherein the logic is further operable to receive an initialization file comprising a list of XML documents, the list of XML documents comprises a location of the first XML document and the second XML document.

18. The media of claim 17, wherein the logic is further operable to receive an updated initialization file replacing the initialization file, the updated initialization file comprising an updated list of XML documents, the updated list of XML documents comprises a location of the first XML document, the second XML document, and a third XML document, the third XML document defining data within at a third XML message type.

19. A method comprising:
receiving at a bridge a text file defining a format of a High Level Architecture (HLA) message, the bridge comprising at least one processor and at least one interface;
receiving at the bridge an eXtensible Markup Language (XML) message;
converting at the bridge the XML message to an HLA message conforming to the text file using at least one schema; and
transmitting from the bridge the HLA message to at least one HLA federate.

20. A method comprising:
receiving at a bridge a High Level Architecture (HLA) message from at least one HLA federate;
converting at the bridge the HLA message to an eXtensible Markup Language (XML) message using at least one schema; and
transmitting from the bridge the XML message over at least one enterprise service bus channel.

* * * * *

UNITED STATES PATENT AND TRADEMARK OFFICE
CERTIFICATE OF CORRECTION

PATENT NO.        : 9,171,067 B2
APPLICATION NO.   : 12/171714
DATED             : October 27, 2015
INVENTOR(S)       : Jared D. Stallings It is certified that error appears in the above-identified patent and that said Letters Patent is hereby corrected as shown below:

In the Specification

In column 3, line 40, delete "130" and insert --120--, therefor

In column 4, line 12, delete "121." and insert --120.--, therefor

In column 4, line 45, delete "200" and insert --230--, therefor

In column 4, line 45, delete "210," and insert --234,--, therefor

In column 4, line 45, delete "220," and insert --236,--, therefor

In column 4, line 46, delete "230." and insert --232.--, therefor

In column 4, line 49, delete "200" and insert --230--, therefor

In column 4, line 52, delete "210" and insert --234--, therefor

In column 4, line 54, delete "200." and insert --230.--, therefor

In column 4, line 56, delete "210" and insert --234--, therefor

In column 4, line 59, delete "210" and insert --234--, therefor

In column 4, line 60, delete "200" and insert --230--, therefor

In column 4, line 61, delete "200" and insert --230--, therefor

In column 4, line 62, delete "220" and insert --236--, therefor

In column 4, line 62, delete "230)." and insert --232).--, therefor

In column 4, line 67, delete "220." and insert --236.--, therefor

Signed and Sealed this
Eighth Day of March, 2016

Michelle K. Lee
*Director of the United States Patent and Trademark Office*

CERTIFICATE OF CORRECTION (continued)
U.S. Pat. No. 9,171,067 B2

In the Specification

In column 5, line 1, delete "200" and insert --230--, therefor

In column 5, line 3, delete "200" and insert --230--, therefor

In column 5, line 6, delete "200" and insert --230--, therefor

In column 5, line 8, delete "200" and insert --230--, therefor

In column 5, line 12, delete "220" and insert --236--, therefor

In column 5, line 16, delete "220" and insert --236--, therefor

In column 5, line 18, delete "200." and insert --230.--, therefor

In column 5, line 19, delete "220" and insert --236--, therefor

In column 5, line 21, delete "220" and insert --236--, therefor

In column 5, line 22, delete "210" and insert --234--, therefor

In column 5, line 23, delete "220" and insert --236--, therefor

In column 5, line 26, delete "230" and insert --232--, therefor

In column 5, line 29, delete "230" and insert --232--, therefor

In column 5, line 30, delete "200" and insert --230--, therefor

In column 5, line 32, delete "200" and insert --230--, therefor

In column 5, line 34, delete "200" and insert --230--, therefor